United States Patent [19]

Kyriakos

[11] 4,435,708
[45] Mar. 6, 1984

[54] MEANS FOR ELIMINATING STEP ERROR IN FM/CW RADIO ALTIMETERS

[75] Inventor: Constantinos S. Kyriakos, Deerfield Beach, Fla.

[73] Assignee: The Bendix Corporation, Southfield, Mich.

[21] Appl. No.: 291,854

[22] Filed: Aug. 10, 1981

[51] Int. Cl.³ .............................................. G01S 9/04
[52] U.S. Cl. .................................... 343/12 A; 343/14
[58] Field of Search ....................... 343/14, 12 A, 17.7

[56] References Cited

U.S. PATENT DOCUMENTS

| | | | |
|---|---|---|---|
| 2,928,085 | 3/1960 | Katz | 343/14 |
| 3,341,849 | 9/1967 | Cordry et al. | 343/14 |
| 4,146,890 | 3/1979 | Klensch | 343/14 |
| 4,291,309 | 9/1981 | Spiller et al. | 343/14 |

Primary Examiner—Maynard R. Wilbur
Assistant Examiner—M. R. Gordon
Attorney, Agent, or Firm—Bruce L. Lamb; W. G. Christoforo

[57] ABSTRACT

A radio altimeter of the FM/CW type which is linearly frequency modulated by a triangular wave exhibits step error in the output indication at times near the peaks of the modulating wave. Step error is eliminated by gating the data which is processed to produce the altimeter output indication to inhibit processing during times the modulation wave is near peak values and to enable processing at other times. Accuracy is further improved by adjusting the duration of the time during which data processing is enabled so as to equal an integral number of cycles of processed data.

6 Claims, 5 Drawing Figures

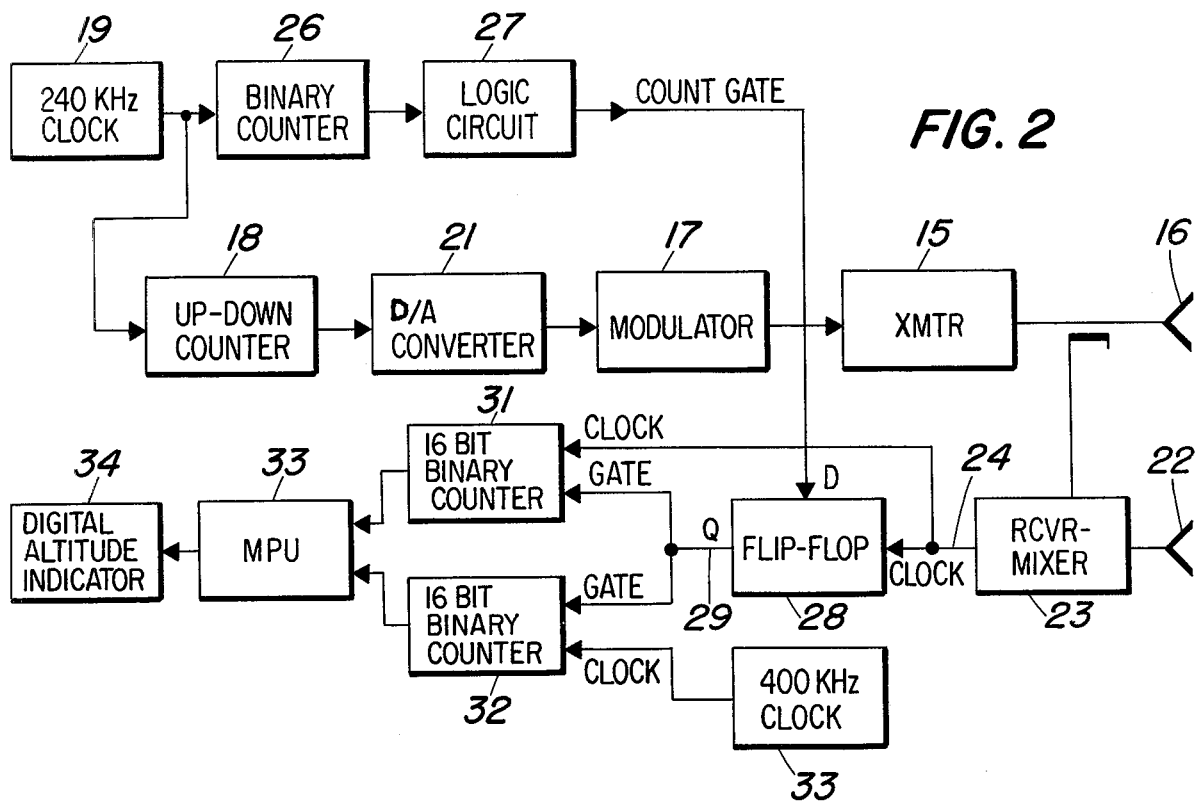
FIG. 2
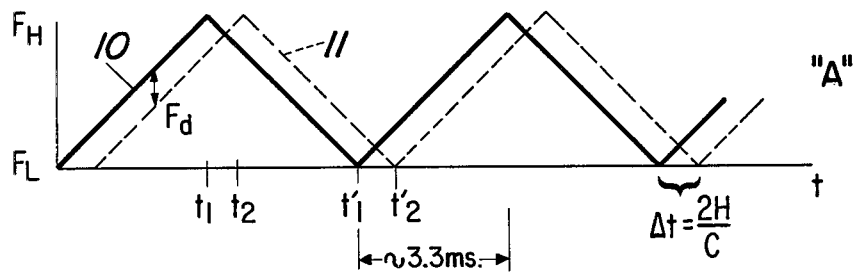
FIG. 1
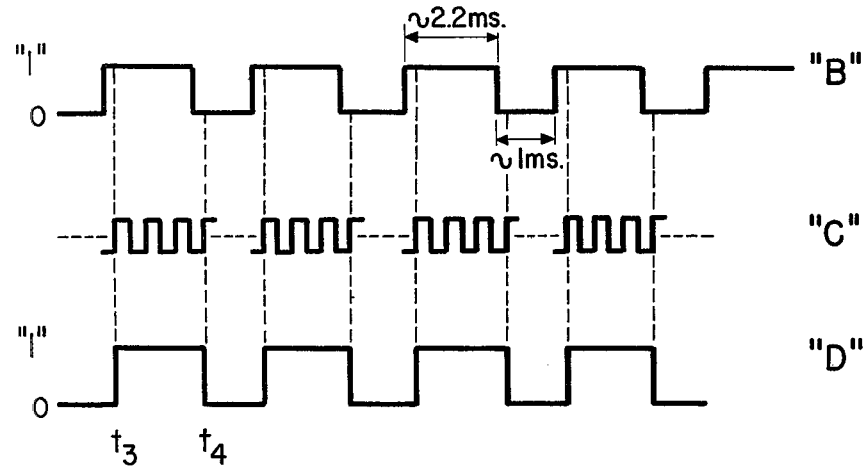

MEANS FOR ELIMINATING STEP ERROR IN FM/CW RADIO ALTIMETERS

The present invention relates to radio altimeters of the FM/CW type. More particularly, it relates to means for eliminating step error in the output of the altimeters.

Radio altimeters of the FM/CW type have become the preferred equipment for accurately measuring aircraft altitude during approach to landing. Most of such equipment in operation is generally of the form described in U.S. Pat. No. 3,341,849 for "Self-Calibrating, Self-Testing Radio Altimeter" by B. L. Cordry et al. In radio altimeters of this type a transmitter is linearly frequency modulated by a modulating voltage having a triangular waveform. A portion of the transmitted signal is mixed with the reflected signal received from the ground to produce a beat frequency signal. The difference between the frequency of the transmitted signal and the received signal, the beat frequency, is proportional to the aircraft altitude and an output indication of the altitude is produced by counting the frequency of the beat signal.

As is well known, errors appear in the beat frequency signal during the time the modulating wave nears its peak values. These errors, known as step errors, result from the fact that at such times the frequencies of the transmitted and received signals approach one another, then become equal then return to the value prevailing prior to modulating wave peak. The beat frequency consequently periodically drops from a constant value to zero at times corresponding approximately to the times at which the modulating wave reaches peak maximum and minimum values. The beat frequency, measured over an entire modulation cycle, is therefore in error and such error is directly reflected in the altitude indicated by the altimeter.

The existence of step error has been recognized in prior equipment and efforts have been made to minimize the effect of the error. In the altimeter disclosed in the above-cited U.S. Pat. No. 3,341,849 the frequency of the modulating wave is varied slightly, or wobbulated, tending to average out the step error. A more direct way to eliminate step error would appear to be to gate-out or prevent beat frequency data from being processed by the frequency counter during the time the data is subject to error. However, analog type frequency counters, as used in the altimeter of U.S. Pat. No. 3,341,849, cannot readily be controlled so as to process accurately intermittent bursts of frequency data. With digital signal processors, a frequency counter can be easily controlled so as to give creditable results when operating with intermittent bursts of frequency data. The obvious manner of control for a digital processor is to generate a blanking gate in synchronism with the modulating wave and to utilize the gate to inhibit operation of a digital beat frequency counter during those intervals at which the modulating wave is near peak value. Such means, however, still present the possibility of error in altitude measurement corresponding to some fractional part of a beat frequency signal cycle since the period during which the beat frequency counter is enabled most probably will not be equal to an integral number of beat frequency cycles.

Accordingly, it is an object of the present invention to provide means for eliminating step error in a radio altimeter of the FM/CW type.

Another object of the invention is to provide a radio altimeter in which frequency data indicative of altitude is processed digitally to produce altitude information in digital form.

Other objects and advantages of the invention will become apparent as a better understanding thereof is gained through a study of the following complete description and accompanying drawings.

Briefly, the invention comprises, in a radio altimeter, digital means for generating a triangular modulating wave for a frequency modulated transmitter. Digital means synchronized with the triangle wave generator produces a count gate which is at a high logic level during most of the linear portion of the triangle wave period and which is at a low logic level during the portion of the period of the triangle wave near the wave peaks. The count gate and the beat frequency signal, produced by mixing transmitted and received signals, are applied to logic means which modifies the duration of the high level state of the count gate to produce a derived count gate having a high logic level always of such duration as to equal an integral number of cycles of beat frequency signal. The derived count gate is then used to control a beat signal frequency counter and a precision clock counter the outputs of which are arithmetically processed to yield digital altitude information free of step error.

In the drawings:

FIG. 1A is a waveform diagram showing the waveform of the modulation voltage and the relationship between the frequencies of the transmitted and received waves of an FM/CW radio altimeter;

FIG. 1B is a waveform diagram showing a count gate, synchronized with the modulation waveform of FIG. 1A, which may be used for blanking-out erroneous information in the difference frequency signal of the altimeter;

FIG. 1C is a waveform diagram representative of the difference frequency signal of the altimeter;

FIG. 1D is a waveform diagram of a derived count gate used to eliminate fractional count errors in counting the frequency of the difference frequency signal, and FIG. 2 is a functional block diagram broadly showing an FM/CW radio altimeter and the means of the present invention for eliminating step error from the output altitude indication.

Referring to FIG. 1A, a triangular wave 10 is shown which represents the form of a modulating voltage applied to a frequency modulated radio altimeter transmitter as well as the frequency variation of the transmitted signal. A similar wave 11 represents the frequency variation of the signal received by the altimeter. The displacement $\Delta t$ between the waves 10 and 11 along the time axis is proportional to the altitude of the aircraft carrying the altimeter. As is evident, the difference, $F_d$, between the frequencies of waves 10 and 11 is constant through the major portion of the cycles of the waves. Step error appears, however, at times near the peaks of the waves, $t_1$, $t_2$ and $t_1' t_2'$ when the frequency difference drops from a constant value to zero and then becomes reestablished at the constant value at a time following the peak of the received wave.

FIG. 1B shows a count gate synchronized with the triangular wave of FIG. 1A. The count gate is at a logic "1" level during times at which valid difference frequency signal $F_d$ is being received and the count gate is at logic "0" level at times surrounding the peak times $t_1$, $t_2$, $t_1't_2'$ of the triangular waves when $F_d$ is subject to step error.

FIG. 1C is a representation of the difference frequency signal $F_d$ simplified to the extent that the frequency is normally much higher than shown and that no attempt has been made to show the variation in frequency resulting from step error. FIGS. 1B and 1C illustrate the most probable case wherein the phasing and duration of the count gate relative to $F_d$ is such that a frequency count taken during the time that the count gate is at a logic "1" level will not contain an integral number of cycles of $F_d$. This source of error is eliminated by applying the count gate of FIG. 1B and the difference frequency signal $F_d$ of FIG. 1C to logic means to produce a derived count gate shown in FIG. 1D.

The derived count gate does not rise to a logic "1" level until the leading edge of the first $F_d$ cycle appears after the count gate of FIG. 1B has risen to a logic "1" level, as at time $t_3$. The derived count gate continues at a logic "1" level as long as the count gate of FIG. 1B remains at a logic "1" level and does not fall to a logic "0" level until the leading edge of the first $F_d$ cycle appears following transition of the count gate of FIG. 1B to a logic "0" level, as at time $t_4$. The derived count gate of FIG. 1D is therefore always of such duration as to contain an integral number of cycles of $F_d$. The derived count gate is utilized to control counters for the frequency of $F_d$ and for a precision clock signal to provide numerical information which is processed to yield digital information of the aircraft altitude, as hereinafter described with reference to FIG. 2.

Referring to FIG. 2, a radio altimeter of the FM/CW type comprises a continuous wave transmitter 15 which supplies signal to a transmitting antenna 16 located in an aircraft to project a radio beam towards the ground. The signal from transmitter 15 is linearly frequency modulated between a low frequency $F_L$ and a high frequency $F_H$ by a triangular wave applied to modulator 17 to produce a transmitted signal having a frequency which varies with time as shown by waveform 10 of FIG. 1A. The triangular modulating wave, suitably having a frequency of 150 Hz, is generated by an up-down counter 18 which counts cycles from a 240 kHz clock 19 and a digital to analog converter 21. For a 150 Hz triangular wave the half-period time is approximately 3.3 ms, which equates to a count of 799 cycles of signal from clock 19. Counter 18 can therefore be set to count up from zero to the binary equivalent of 799 then down to zero again during which time the running count is continuously converted to an analog voltage by converter 21, thereby producing a 150 Hz triangular wave.

The beam transmitted by antenna 16 and reflected by the ground is received by antenna 22 then mixed with a small portion of the outgoing wave from transmitter 15 in receiver mixer 23. The signal at the output 24 of receiver-mixer 23 is the frequency difference signal of FIG. 1C containing frequency variations due to step error.

The count gate of FIG. 1B is generated by a binary counter 26 and a logic circuit 27. Counter 26 continuously accumulates count of the output cycles of clock 19 during each halfperiod of the triangular wave output of converter 21. Logic circuit 27 decodes the output of counter 26 to produce a logic "1" after counter 26 accumulates the binary equivalent of 120 and until counter 26 has accumulated binary count corresponding to 648, whereupon the output of logic circuit 27 drops to the logic "0" level. The waveform of the count gate therefore exhibits a low level for approximately 0.5 ms after the start of a modulation wave followed by a high level for approximately 2.2 ms and again dropping to low level for approximately 0.5 ms. The count gate is so related to the triangular modulating wave that the high level state of the count gate appears during the linear portion of the triangular wave and the low level state appears prior to and persists after the peaks of the triangular wave, being substantially centered thereon.

The count gate output of logic circuit 27 and the difference frequency signal at the receiver-mixer output 24 are applied to a logic circuit 28 to produce at the output 29 thereof the derived count gate of FIG. 1D. Logic circuit 28 may suitably comprise a D-type flip-flop with the count gate from logic circuit 27 applied to the D input thereof and the difference frequency signal $F_d$ from output 24 applied to the clock input thereof. A D-type flip-flop has the property of transferring the state of the signal present at its D input to its Q output upon the appearance of a high level signal at its clock input. Therefore the derived gate at the Q output 29, if initially at a low level, does not transition to a high level until the first positive-going pulse of $F_d$ appears after the appearance of a high count gate level at input D, as at time $t_3$ in FIG. 1D. Transistion of the output 29 from high level to low level occurs after the D input has fallen to low level and at the time the first positive-going pulse on the clock input appears, as at $t_4$ in FIG. 1D. The derived count gate of FIG. 1D is therefore always of such duration as to contain an integral number of cycles of $F_d$ and it is positioned by the count gate relative to the triangular wave of FIG. 1A so as to be in a high level state only during the linear portions of the triangular wave.

The derived clock gate present on output 29 is applied to the gate input of a first 16-bit binary counter 31 which receives the $F_d$ signal from output 24 on the clock input thereto. The derived count gate from output 29 is also applied to the gate input of a second 16-bit binary counter 32 which receives at the clock input thereto the output of a 400 kHz clock oscillator 33. The output of counter 31 is the binary count of the number of cycles of $F_d$ occurring during the time derived count gate is in a logic "1" state. The output of counter 32 is the binary count of the number of cycles of clock signal from oscillator 33 occurring during the time the $F_d$ cycle count is being collected. The numerical outputs of counters 31 and 32 are processed arithmetically by a microprocessor unit 33 to produce the digital value of the aircraft altitude which may be displayed on an indicator 34 or otherwise utilized in the operation of the aircraft.

The computation performed by the microprocessor unit upon the numerical information received from counters 31 and 32 provides a solution to the following equation:

$$H = \frac{F_d \cdot c}{2\left(\frac{dF}{dt}\right)} \quad (1)$$

where

H is the aircraft altitude;
$F_d$ is the frequency of the difference frequency signal;
c is the velocity of propagation of radio waves; and dF/dt is the slope of waveform 10 in FIG. 1A.

The parameters of a specific embodiment of the invention apply to equation (1) as follows:

The frequency of the transmitted signal is varied cyclically between a low value $F_L = 4.235$ GHz and a high value $F_H = 4.365$ GHz at 150 Hz, the modulation half-period equals 1/300 or 3.3 ms., approximately, therefore $$\frac{dF}{dt} = \frac{(4.365 - 4.235) \times 10^9}{3.3 \times 10^{-3}} = 3.94 \times 10^{10}$$

$c = 9.8 \times 10^8$ feet/s (approximately).

Inserting these values, equation (1) reduces to $$H = \frac{F_d}{80} \text{ feet (approximately).} \quad (2)$$

$F_d$ is determined by dividing the output $N_1$ of counter 31 by the product of the output $N_2$ of counter 32 and the period $T_c$ of the clock signals from oscillator 33. Therefore, the microprocessor needs merely to divide $N_1$ by $N_2$ and multiply the resulting quotient by a predetermined constant to produce the numerical value of the aircraft altitude. For the stated parameters, $$T_c = \frac{1}{400 \times 10^3}$$

Substituting for $F_d$ in equation (2)

$$H = \frac{N_1}{N_2 \frac{1}{400} \times 10^3} \cdot \frac{1}{80} = \frac{N_1}{N_2} \cdot 5 \times 10^3 \text{ feet.}$$

The predetermined constant ($5 \times 10^3$) is, of course, converted to its binary equivalent prior to insertion in the microprocessor 33 and the output of the microprocessor appears in binary form which may be converted to decimal for display or retained in binary for utilization elsewhere.

The invention claimed is:

1. In a radio altimeter of the FM/CW type having a radio transmitter modulated in frequency by a cyclic modulating wave, portions of which vary linearly with time, a receiver for receiving reflections from an object of signals transmitted by said transmitter and a mixer to which signals received by said receiver and a portion of the signal transmitted by said transmitter is applied to produce a frequency difference signal the frequency of which is indicative of the distance between said transmitter and the object reflecting signals from said transmitter, means for eliminating step error in the output indication of the altimeter, comprising, means for generating a first gate signal having a logic "1" level during times said modulating wave varies linearly with time and a logic "0" level at other times;

logic means to which said first said gate signal and said frequency difference signal are applied, said logic means being responsive to said logic "1" level of said first gate signal and said frequency difference signal to produce a second gate signal having a logic "1" level of duration beginning with the coincident appearance of said logic "1" level of said first gate signal and the beginning of a cycle of said difference frequency signal and extending for an integral number of cycles of said frequency difference signal while said first gate signal remains at said logic "1" level;

means controlled by said logic "1" level of second gate signal for determining the frequency of said difference frequency signal during the period of said logic "1" level of said second gate signal; and means for numerically processing said frequency of said difference frequency signal to provide a distance indication as the output of said altimeter.

2. Step error elimination means as claimed in claim 1 wherein said means for determining the frequency of said frequency difference signal includes, a clock signal generator and a pair of counters, each of said counters being enabled during said logic "1" level of said second gate signal, one of said counters being active when enabled to count said difference frequency signal, the other of said counters being active when enabled to count signal from said clock signal generator.

3. Step error elimination means as claimed in claim 1 wherein said logic means comprises, a "D" type flip-flop having a D input, a clock input and a Q output, said flip-flop having the property of transferring to said Q output the logic level present on said D input upon the appearance of a logic "1" level on said clock input, said first gate signal being applied to said D input, said frequency difference signal being applied to said clock input and said second gate signal appearing at said Q output.

4. Means for eliminating step error in a radio altimeter of the FM/CW type, said altimeter including a transmitter, a receiver and a mixer for combining a portion of the signal from said transmitter with signal received by said receiver to produce a frequency difference signal, said transmitter being responsive to a modulation wave applied thereto to produce a signal for transmission having a frequency which varies in accordance with said modulation wave, comprising a clock oscillator;

an up-down counter receiving the output of said clock oscillator, said up-down counter incrementing a minimum number preset therein upon the appearance of each cycle of signal from said clock oscillator until a maximum preset count is accumulated therein, then decrementing said accumulated count upon the appearance of each cycle of signal from said clock oscillator until said accumulated count is equal to said preset minimum number;

a digital to analog converter and converting the same to an output voltage having a magnitude proportional to said accumulated count, said output voltage being applied to said transmitter as said modulation wave;

a second counter receiving the output of said clock oscillator, said second counter accumulating a continuous count of cycles of signal from said clock oscillator;

logic means for decoding said count accumulated by said second counter to produce a gate signal having a logic "1" level for counts accumulated by said second counter intermediate of said preset minimum and said preset maximum counts of said up-down counter; and means controlled by said gate signal and operative during said logic "1" level of said gate signal for determining the frequency of said frequency difference signal, said last named means including, second logic means to which said gate signal and said difference frequency signal are applied, said second logic means being responsive to said logic "1" level of said gate signal and to said difference frequency signal to produce a second gate signal having a logic "1" level of duration equal to an integral number of cycles of said difference frequency signal; and a third counter controlled by said second gate signal for counting the number of cycles of said difference frequency signal occurring during the time said second gate signal is at a logic "1" level.

5. Means for eliminating step error as claimed in claim 4 wherein said means for determining the frequency of said difference frequency signal includes additionally, a second clock oscillator, and a fourth counter controlled by said second gate signal for counting the number of cycles of signal from said second clock oscillator occurring during the time said second gate signal is at a logic "1" level.

6. Means for eliminating step error as claimed in claim 5 wherein said means for determining the frequency of said difference frequency signal includes, means for dividing the count accumulated by said third counter by the count accumulated by said fourth counter.

* * * * *